US012513045B2

(12) United States Patent
Singh et al.

(10) Patent No.: US 12,513,045 B2
(45) Date of Patent: Dec. 30, 2025

(54) SERVERLESS NETWORK INTERFACE (71) Applicant: Amazon Technologies, Inc., Seattle, WA (US)

(72) Inventors: Prashant Kumar Singh, Seattle, WA (US); Kshitij Gupta, Seattle, WA (US); Ravi S Nagayach, Aurora, IL (US); Eric Mills, Blackwood, NJ (US); Robert Laks, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/622,646

(22) Filed: Mar. 29, 2024

(65) Prior Publication Data
US 2025/0310185 A1    Oct. 2, 2025

(51) Int. Cl.
*H04L 41/0806* (2022.01)
*H04L 41/0894* (2022.01)
*H04L 41/0895* (2022.01)

(52) U.S. Cl.
CPC ...... *H04L 41/0806* (2013.01); *H04L 41/0894* (2022.05); *H04L 41/0895* (2022.05)

(58) Field of Classification Search
CPC ............... H04L 41/342; H04L 41/0806; H04L 41/0894; H04L 41/0895; H04L 41/0873
USPC .................................................. 709/220, 221
See application file for complete search history.

(56) References Cited

U.S. PATENT DOCUMENTS

| | | | | |
|---|---|---|---|---|
| 10,645,020 | B1* | 5/2020 | Subramanyam | H04L 41/20 |
| 10,649,861 | B1* | 5/2020 | Natanzon | H04L 12/66 |
| 10,986,184 | B1* | 4/2021 | Seymour | H04L 65/80 |
| 11,012,521 | B1* | 5/2021 | Fuller | H04L 41/0895 |
| 11,275,631 | B1* | 3/2022 | Shlychkov | G06F 9/544 |
| 11,403,154 | B1* | 8/2022 | Agarwal | G06F 9/5005 |
| 11,853,114 | B1* | 12/2023 | Ridoux | G06F 1/10 |
| 2018/0302277 | A1* | 10/2018 | Shimamura | H04L 41/145 |
| 2019/0149480 | A1* | 5/2019 | Singhvi | H04L 47/2483 |
| | | | | 709/226 |
| 2019/0182128 | A1* | 6/2019 | Shimamura | H04L 41/40 |
| 2021/0218644 | A1* | 7/2021 | Mestery | G06N 20/00 |
| 2023/0137273 | A1* | 5/2023 | Kuris | H04L 41/40 |
| | | | | 709/221 |
| 2024/0179158 | A1* | 5/2024 | Kommula | G06N 5/01 |
| 2024/0314577 | A1* | 9/2024 | Singh | H04L 43/0852 |

OTHER PUBLICATIONS

Anonymous "Aws Lambda developer guide—first 400 pages" URL: https://web.archive.org/web/20240324062511mp/https://docs.aws.amazon.com/pdfs/lambda/latest/dg/lamdba-dg.pdf#configuration-ypc, Mar. 9, 2024 retrieved from internet, p. 10-19, 52-55, and 151.

(Continued)

*Primary Examiner* — Nasser M Goodarzi
(74) *Attorney, Agent, or Firm* — Knobbe, Martens, Olson & Bear, LLP (57) ABSTRACT Systems and methods are described for creating a serverless network interface for serverless functionalities. The present disclosure provides for creation of user-defined serverless network interfaces that facilitate creation, modification, and re-use of network configurations across one or more serverless functionalities via network interfaces associated with each function.

20 Claims, 6 Drawing Sheets

(56) References Cited

OTHER PUBLICATIONS

Anonymous "Amazon Virtual Private Cloud user Guide—first 400 pages and pp. 401-481 11" URL:https://web.archive.org/web/20240309100057/https://docs.aws.amazon.com/pdfs/vpc/latest/userguide/voo-ug.pdf/what-is-amazon-vpc, Mar. 9, 2024 retrieved from the internet, pp. 43, 93, 119, and pp. 403 and 406.
Ahmad Shakeel et al: "Deployment models for AWS Network Firewall", URL: https://aws.amazon.com/blogs/networking-and-content-delivery-deployment-models-for-aws-network-firewall/, Nov. 17, 2020 retrieved from the internet.
Schmidt Tobias: "Making the Most of AWS Lambda—Navigating Its Limitations for Better Results", URL: https://awsfundamentals.com/blog/lambda-imitations, Mar. 11, 2023 retrieved from the internet.
Ferman JJ: "AWS Networking Quirks", URL:https://www.knowbe4.com/careers/blogs/engineering/aws-networking-quirks, Nov. 9, 2022 retrieved from the internet.
Digital Cloud Training: "Connecting a Lambda function to a VPC {Virtual Private Cloud)", URL: https://www.youtube.com/watch?v=beV1AYyhgYA, May 2, 2020 retrieved from the internet.
International Search Report and the Written Opinion Application No. PCT/US2025/021742 dated Jun. 2, 2025 in 19 pages.

* cited by examiner

SERVERLESS NETWORK INTERFACE

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

DETAILED DESCRIPTION

Generally described, aspects of the present disclosure relate to providing serverless network interfaces (SNI) that can be attached to serverless instances, such as instances of serverless code functions. Such SNIs can extend benefits of existing serverless offerings-such as programmatic creation, configuration, and lifecycle management—to network interfaces in a manner that increases the functionality and flexibility of existing serverless offerings beyond that offered by current network technologies.

Specifically, embodiments of the present disclosure enable a user, such as the owner of a serverless function (or other serverless functionality), to create and manage a network interface that defines network configurations of a serverless function in a virtualized network environment, such as compute and storage resources in a "virtual private cloud" or other isolated environments. While serverless technologies enable on-demand implementation of desired functionality without managing an execution environment, existing technologies limit users' capabilities to define individual network connectivity interfaces and reuse network configurations across serverless environments. This limitation results in more underlying network resource use and overheard for the user. For example, end users cannot define access controls for network configuration management across multiple serverless environments at once or adjust configurations for multiple network interfaces independently. The configurations may relate to egress controls, internet gateways (IGW), user access controls, firewalling, domain name system (DNS), and maximum transmission units (MTU). Currently, users must specify these configurations for each serverless environment, leading to static, network configurations that prevent instances from communicating directly without configuring an additional static network Embodiments of the present disclosure address these problems, among others, by providing an SNI for defining the network definitions of one or more serverless functionalities. This SNI represents a directly configurable logical object that can be created and configured by an end user to provide serverless networking functionality to instances of their serverless applications. SNI enables serverless users to define n-number of reusable network connectivity interfaces for their serverless applications. The SNI can be backed by one or more network interfaces, which can be virtual or physical, that are attached to serverless instances. The SNI also can include a virtual networking service that enables communication among the network interfaces and other network destinations per its configuration. Serverless instances can attach to the SNI to gain its networking functionality. The SNI can be scaled and managed in a serverless manner, without requiring users to explicitly allocate resources to it, trigger creation, manage its lifecycle, trigger destruction, etc. The SNI provides networking functionality in a serverless manner, enabling the benefits of serverless systems to extend into the networking space and enabling more efficient operation of other serverless services. By decoupling network configuration from the application, SNI enables reusing the same network configuration across multiple applications, reducing the need for duplicating network resources.

Code execution is one type of serverless functionality (also referred to as a serverless service or serverless system) that may benefit from access to an SNI. As described herein, a serverless code execution system (which may also be referred to as an "on-demand code execution system") enables rapid execution of source code, which may be supplied by users of the on-demand code execution system. For example, a user may submit code in a specific programming language (e.g., the PYTHON™ language) that, when executed, implements network-based processing for a user-facing application (e.g., a mobile device "app"). The serverless code execution system can then enable the user to submit "calls" or "invocations" to execute that code, at which point the system will securely execute the code to provide the desired functionality. Embodiments for providing a serverless code execution system are provided, for example, in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference. In brief, an on-demand code execution system can enable client devices to submit executable code (e.g., source code) implementing desired functionality, which functionality is generally referred to herein as a "task" or a "function." The system can further enable a client device to define one or more triggers that result in execution of the code on the system. For example, a client device may request that each time a specific application programming interface (API) call is made, the code should be executed on the serverless code execution system. When a trigger occurs, the serverless code execution system can configure an execution environment for the code, which may correspond to a virtual machine instance, a software container, or other logically isolated environment in which code can execute. The serverless code execution system can then execute the code within the environment, resulting in a task execution. When the task execution completes, the serverless code execution system can remove the environment, thus freeing computing resources for other task executions.

Unlike some other network-based services, a serverless system (of which a serverless code execution system is one example among many, including serverless data storage, data transformation, data stream handling, data searching, and databases) can remove the need for a user to maintain or configure a computing device, either virtual or physical, to support serverless functionality. Due to this lack of need for a user to maintain a device, serverless systems are referred to as "serverless" (though of course the serverless system itself, as opposed to individual users, may maintain servers to support serverless functionality).

A serverless system implementing a serverless service (e.g., a network-based service that implements functionality of the server in a serverless manner) may be provided as part of a variety of network-based services. For example, a serverless system may be provided as part of a hosted computing environment providing a number of rapidly provisioned and released computing resources. A hosted computing environment may also be referred to as a "cloud computing environment." Illustratively, a cloud computing environment may include a distributed set of physical computing resources that can be rapidly acquired for use by users of the cloud computing environment. Often, the cloud computing environment can provide resources to users in the form of virtualized compute resources, such as virtual machines, virtual storage volumes, various other functionalities implemented using virtual machines or storage volumes, etc. In addition, a cloud computing environment may provide for virtualized networking functionality. For example, the cloud computing environment can include a variety of distributed systems in communication via a physical substrate network. The cloud computing environment may define multiple virtualized logical networks on top of the physical substrate network, via which resources on the environment can communicate. For example, the cloud computing environment may enable clients to acquire access to virtual computing resources (e.g., virtual machines) that are provided with network addresses in a logical network. In some cases, these network addresses may be isolated from other resources. For example, a set of network resources may share a specific subnet (e.g., a/24 IP version 4 subnet in Classless Inter-Domain Routing or CIDR notation) and have no access to network resources outside that subnet, or access limited by various network functionalities (e.g., a firewall). Thus, using a cloud computing environment, a user may acquire a variety of compute resources (such as virtual compute resources) and arrange such resources into an isolated network. As a result, users may acquire computing resources similar to those provided by traditional data centers, without requiring that the end user physically manage computing devices, networks, or the like.

In addition to serverless code execution system, other types of serverless services may also exist. This may include other types of serverless computes, such as serverless machine learning models, serverless Audio/Video processing, serverless extract, transform, and load (ETL), etc. Other types of serverless services may also include types of serverless data storage, such as serverless databases, data lakes, data stream handling, data transformation, serverless search systems, etc.

At a high level, serverless systems may provide serverless functionality by obtaining requests that require computing resources and programmatically identifying, allocating, and managing those resources to respond to the requests. For example, a serverless code execution system may operate by accepting requests to execute code, identifying, allocating, and managing an execution environment to execute the code (including, e.g., provisioning environment with the code, any dependencies, etc.), and then instructing the environment to execute the code in response to the requests. An environment for serverless functionality may be referred to as an "instance" of the functionality (a "serverless instance"). Each serverless instance is illustratively implemented using an underlying host computing device, potentially using one or more virtualization layers (e.g., a virtual machine, a software container, or the like). To provide networking functionality, the host computing device generally can include a physical network interface controller (NIC). Depending on the configuration, a serverless instance may access a network directly via the physical NIC or via a virtual NIC layered on top of the physical NIC. As part of the process of managing the serverless instance, the serverless system can configure the (physical or virtual) NIC with an IP address, firewalls, etc.

In some instances, a given serverless system might enable users to specify network parameters for instances of that system. However, such specification is generally limited and inflexible. For example, there may be little or no way to specify that two instances should be configured to communicate with one another (as the network address of each instance may not be known a priori). Moreover, such specification is generally limited to each serverless service—for example, a serverless code execution system may enable configuring code execution instances, a serverless database system may enable configuring serverless database instances, etc. These static instance configurations are often of limited value and cannot provide full network management functionality. While options may exist to avoid these issues, these options may incur their own detriments. For example, a user may configure a virtual private cloud (VPC) or the like in which serverless instances execute, and configure the VPC with a desired network configuration. However, that VPC may not itself operate serverlessly—that is, it may require manual creation, management, and configuration by an end user. As such, it may use excess computing resources compared to a serverless networking system, and be more complex to administer.

The present disclosure solves the above-noted problems and relieves the above-noted difficulties by providing for user-defined SNIs that are logically addressable serverless interfaces. Specifically, as disclosed herein, a SNI can enable end users of serverless instances to create a SNI to define network configurations for one or more serverless instances. The SNI can be represented as a logical object that an end-user can configure. The system may perform the serverless actions for the SNI, such as allocating resources, creating the SNI, managing the lifecycle (e.g., deleting the SNI when it is no longer needed, etc.), etc. The SNI may be configured similarly to a regular network interface in some aspects. For example, the SNI may be configured to have certain network permissions, address resolution rules, and the like. In addition, the SNI may be configured in other aspects not generally applicable to network interfaces, such as by setting permissions on the SNI for what instances or other resources may use the SNI, whether multiple instances or resources may connect to the SNI concurrently, what communication is enabled between instances or resources currently using the SNI, and the like. Each SNI may be configured for n-number of serverless instances. Additionally, an instance of a serverless function or other serverless functionality may have any number of SNIs attached. The SNIs may also be detached and reattached to a different instantiation of a serverless function. Other configurable parameters for the SNI can include connection configurations (e.g., Internet Gateway, Ingress, VPC, etc.), access controls (e.g., Identity and Access Management ("IAM") role, resource policies, etc.), firewall configurations (e.g., ingress rules and egress rules), DNS configurations (e.g., nameservers, retry configurations, search domains, etc.), and MTU configurations. An SNI connection configuration may have its own definition of properties depending on the defined connectivity type (e.g., IGW, VPC, Ingress, etc.). For example, IGW may be none, Ingress may be Ipv6 prefix delegated, and VPC may be subnet IDs and Security Groups.

In the present disclosure, instead of configuring a virtual NIC according to a static pre-configuration, a service can configure the virtual NIC as a serverless NIC. When the system gets a request to create a serverless NIC, it manages the underlying network to implement the pre-configured functionality of the serverless NIC. For example, the serverless NIC may provide network access. If so, the system creates a virtual NIC on a serverless-hosting VM with network access. The serverless NIC may provide VPC access. If so, the virtual NIC on our serverless host VPC can get access to the VPC. Additionally, the serverless NIC may provide intra-instance communication. If so, a router can be set up to enable each virtual NIC associated with the SNI to talk to one another, including discovery. So, the serverless functions are done on the network size and resources can be configured on-demand and as needed.

Furthermore, the present disclosure provides for a mechanism for discovery of devices and other serverless instances using an SNI via the virtualized networking service. The discoverable devices may be both internal and external to the SNI as specified in the permissions of the SNI. For example, a serverless instance associated with an SNI may be able to discover other members of the SNI (e.g., instances associated with the SNI) by requesting membership information of the other members and the SNI returning membership contact information (e.g., location address information of the member instance) to the instance.

Figure 1:
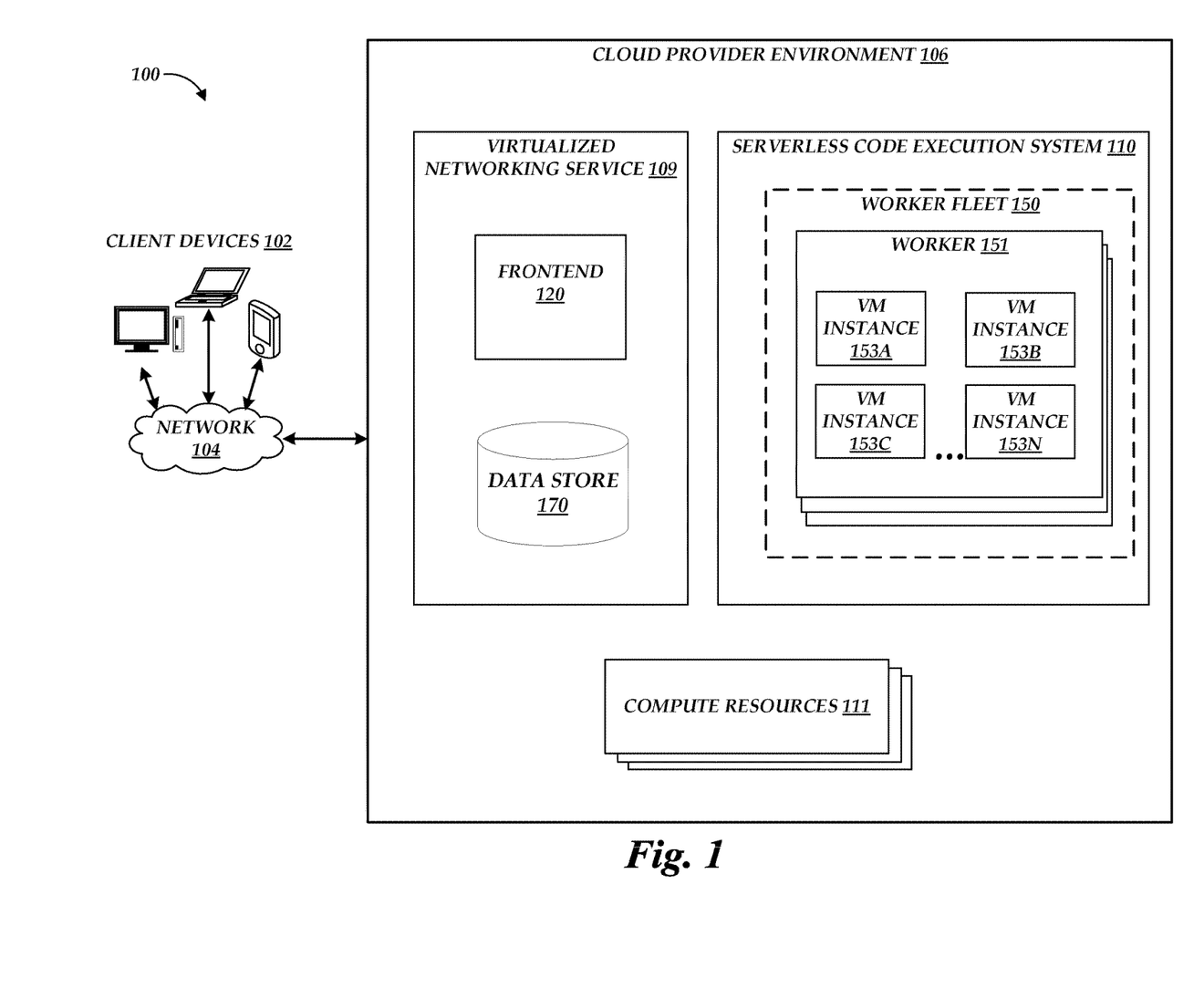
FIG. 1 is a block diagram depicting an illustrative environment in which a cloud provider environment enables secure network communication between executions of serverless functions and other network environments via a serverless network interface (SNI) implemented on a virtualized networking service.

FIG. 1 is a block diagram of an illustrative operating environment 100 in which embodiments of the present disclosure may be implemented. Specifically, in FIG. 1, client devices 102 may utilize a network 104 to interact with a cloud provider environment 106, including a serverless code execution system 110 facilitating execution of serverless functions, compute resources 111 acquirable by users for implementation of various network-accessible functionalities, and a virtualized networking service 109 enabling creation of virtualized isolated networks (including VM instances 153) through which compute resources 111 are accessible. In accordance with embodiments of the present disclosure, the cloud provider environment 106 may facilitate creation of SNIs, provided for example by the virtualized networking service 109, that facilitate network communications between serverless functions as executed by the serverless code execution system 110 and compute resources 111 as included in virtualized networks provided by the virtualized networking service 109.

By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The cloud provider environment 106 may provide the client devices 102 with one or more user interfaces, command-line interfaces (CLIs), application programing interfaces (APIs), and/or other programmatic interfaces for utilizing services provided by the cloud provider environment 106. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the cloud provider environment 106.

The client devices 102 and cloud provider environment 106 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In FIG. 1, compute resources 111 can correspond to a variety of network-accessible resources provided by the cloud provider environment 106 for use by users. For example, compute resources 111 can include virtual machines hosted by physical computing devices, "bare metal" instances corresponding to physical computing devices, data storage resources (such as object storage collections, block storage volumes, databases, or the like), computer-provided services (such as web services, APIs, data queues, data processing services), or the like. Each compute resource 111 may represent a physical compute resource provisioned to (and thus "owned" by) a given user of the cloud provider environment 106 or a virtualized compute resources supported by an underlying physical resource and similar provisioned to a user. The cloud provider environment 106 can secure each compute resource 111 such that it is inaccessible by any entity other than the owner, including the cloud provider environment 106. Thus, the compute resources 111 may provide functionality similar to or the same as physical compute resources operated by a user.

Illustratively, various components of the cloud provider environment 106 are in communication with one another via a substrate network (not shown in FIG. 1). The substrate network may be dedicated to management and operation of the cloud provider environment 106, and thus inaccessible to, for example, compute resources 111 or by the network 104. Rather, the substrate network can support virtualized logical networks that operate "on top" of the substrate network to facilitate secure communication between particular elements of the cloud provider environment 106. These virtualized logical networks are illustratively dynamic and reconfigurable, such that communication between certain elements or components of the cloud provider environment 106 can be controlled by reconfiguration of virtualized logical networks, as opposed to physical modification of the substrate network.

As noted above, the cloud provider environment 106 can facilitate creation of virtualized, isolated networks (referred to herein simply as an "virtualized network environment," which may also be various referred to as a virtual private cloud (VPC) environment, virtual cloud network (VCN), virtual network (VNet) environment, etc.) via which compute resources 111 communicate with one another and potentially external networks, such as network 104. Specifically, the cloud provider environment 106 includes a virtualized networking service 109 configured to enable creation of isolated networks within the cloud provider environment 106 (each isolated network representing a virtualized logical network supported by an underlying physical substrate network). Like compute resources 111, the isolated networks created by the virtualized networking service 109 may be "owned" by users of the cloud provider environment 106, such that traffic on the isolated network is inaccessible by any entity other than the owner, including the cloud provider environment 106. Thus, the virtualized networking service 109 can enable creation of private networks that are functionally similar to or the same as physical networks built by a user.

To enable interaction with the virtualized networking service 109, the virtualized networking service 109 includes a frontend 120. In an illustrative embodiment, the frontend 120 serves as a "front door" to the other services provided by the virtualized networking service 109, enabling users (via client computing devices 102) to create and configure the definitions of an SNI. The frontend 120 includes a variety of components to enable interaction between the virtualized networking service 109 and other computing devices. For example, the frontend 120 may include a request interface providing client computing devices 102 with the ability to specify parameters for the SNI to the virtualized networking service 109 and to thereafter request creation of that SNI. In one embodiment, the request interface communicates with external computing devices (e.g., client computing devices 102, compute resources 111, etc.) via a graphical user interface (GUI), CLI, or API. The frontend 120 processes the requests and makes sure that the requests are properly authorized. For example, the frontend 120 may determine whether the user associated with the request is authorized to access the source code specified in the request.

An end user may invoke a function from one of the client devices 102 to the serverless code execution system 110 (referred to in various implementations as an on-demand code execution service, serverless compute service, function compute service, functions service, cloud functions service, or functions-as-a-service). The serverless code execution system 110 then can distribute execution instructions for the function and instruct the worker 181, which is described in further detail with respect to FIG. 5.

The frontend 120 can further include an output interface configured to output information regarding the SNI. Illustratively, the output interface may transmit data regarding the SNI (e.g., network connectivity, permissions, etc.) to the client computing devices 102.

The frontend 120 may store the definitions of the SNI in the data store 170. The data store 170 corresponds to any persistent data store. In one embodiment, the data store 170 is implemented as logical storage on a cloud storage service, such as an object storage system. An example of such an object storage system is AMAZON™'s SIMPLE STORAGE SERVICE™ (or "S3™"). In accordance with embodiments of the present disclosure, the definitions of the SNI may correspond to a variety of parameters relating to the SNI. For example, the parameters may include permissions for the SNI, such as a type, amount, or timing of traffic that is permitted to flow across the SNI. The permissions may specify a volume of traffic permitted to flow across the SNI, a number of simultaneous connections supported by the SNI, or the like. Permissions may further specify one or more serverless functions (e.g., by unique identifier of the functions) whose executions are permitted to utilize the SNI. In some embodiments, permissions may specify serverless interfaces to which the SNI should link executions. The parameters can further include an intra-SNI communication type. For example, an intra-SNI communication type may be a mesh networking within the SNI or no communication within the SNI. The parameters may also include rules for address allocation (e.g., how IP addresses are allocated to SNI-using-instances).

In addition to the compute resources 111 and the virtualized network service 109, the cloud provider environment 106 includes a serverless code execution system 110. In FIG. 1, users, by way of client computing devices 102, may interact with the serverless code execution system 110 to provide source code, and establish rules or logic defining when and how such code should be executed on the serverless code execution system 110, thus establishing a "task" or "function." For example, a user may wish to run a piece of code in connection with a web or mobile application that the user has developed. One way of running the code would be to acquire virtual machine instances from service providers who provide infrastructure as a service (e.g., as compute resources 111), configure the virtual machine instances to suit the user's needs, and use the configured virtual machine instances to run the code. To avoid the complexity of this process, the user may alternatively provide the code to the serverless code execution system 110, and request that the serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying). Although FIG. 1 depicts a serverless code execution system 110, this is not meant to be limiting. The cloud provider environment 106 may also include other serverless services, such as other compute functionalities, data storage, and networking.

Code executions triggered on the serverless code execution system 110 of FIG. 1 are executed by execution environments hosted by a worker 151 within a worker fleet 150. The worker 151 is illustratively a host device configured to host multiple execution environments, which in FIG. 1 are virtual machine instances 153A-N. In some implementations, virtual machine instances 153A-N may be managed by a compute service that the serverless code execution system 110 can call via API to create and terminate virtual machines, as needed to run serverless workloads. Execution environments may alternatively include software containers, sometimes referred to as "OS-level virtualization," another virtualization technology. These may be managed by a container service and run on top of the virtual machines of the compute service, in some implementations, and in other implementations the containers may be run directly on a host with the runtime virtualized to them by the host controller. Thus, where references are made herein to VM instances 153, it should be understood that (unless indication is made to the contrary) a container may be substituted for such instances 153.

As used herein, the term "virtual machine instance" is intended to refer to an execution of software or other executable code that emulates hardware to provide an environment or platform on which software may execute (an "execution environment"). Due to their emulation of hardware, these virtual machine instances are sometimes referred to as "system virtual machines." System virtual machines are different than, for example, process virtual machines that do not emulate hardware. Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor.

Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

As shown in FIG. 1, the worker 151 may host a number of instances 153A-N. Each instance 153 may be isolated from other instances 153, thus ensuring the security of code executions on the serverless code execution system 110. For example, each instance 153 may be divided by a virtualization boundary, by virtue of the instance 153 being a virtual machine hosted by the worker 151. In addition, each instance 153 may exist within a partitioned user space on the worker 151, which logically partitions resources of the worker 151 among instances 153. Each user space may, for example, represent a "chroot" jail—a known isolation technique for LINUX™ operating systems.

To facilitate rapid execution of code, the worker 151 may be configured to maintain a set of instances 153 in a "pre-warmed" state, being at least partially configured to begin execution of code. For example, instances may be created on the worker and configured with access to computing resources (CPU, RAM, drive storage, etc.). In some cases, it may be impractical or impossible to maintain instances 153 in a fully warmed state for all possible code executions, as executions may be associated with a wide variety of at least partially distinct data sets (e.g., disk images and/or snapshots). Thus, instances 153 may be maintained in a "greatest commonality" for a given group of tasks, such as being provisioned with a set of computing resources common to those tasks, being configured to accept an operating system type used by those tasks, etc.

On receiving instructions to provision an instance 153 to support execution of the task, the worker 151 may adjust the configuration of the instance 153 to support that execution. Specifically, the worker 151 may provision the instance 153 with access to a disk image or snapshot corresponding to the task. In some instances, the worker 151 may retrieve the disk image for the task and store the full image locally. In other instances, the worker 151 may provide to an instance 153 what appears to be full local access to the disk image or snapshot, while "lazily" retrieving portions of that image or snapshot in response to a request to read such portions. Techniques for providing lazy retrieval of image portions are discussed in the U.S. patent application Ser. No. 17/105,250, filed Nov. 25, 2020 and entitled "LOW LATENCY ACCESS TO DATA SETS USING SHARED DATA SET PORTIONS" (the "'250 Application") the entirety of which is hereby incorporated by reference.

While not shown in FIG. 1, the illustrative environment can further include one or more network services—either as part of or distinct from the cloud provider environment 106—which can interact with the serverless code execution system or other elements of the cloud provider environment 106. Network services can correspond to network-connected computing devices, such as servers, which generate data accessible to the cloud provider environment 106, receive data from cloud provider environment 106 or otherwise communicate to the cloud provider environment 106. For example, the network services can include web services (e.g., associated with the client computing devices 102, with the serverless code execution system 110, or with third parties), databases, really simple syndication ("RSS") readers, social networking sites, or any other source of network-accessible service or data source. In some instances, network services may be invoked by code execution on the serverless code execution system 110, such as by API calls to the network services.

The cloud provider environment 106 is depicted in FIG. 1 as operating in a distributed computing environment including several computer systems that are interconnected using one or more computer networks (not shown in FIG. 1), which systems operate to provide the cloud provider environment 106. The cloud provider environment 106 could also operate within a computing environment having a fewer or greater number of devices than are illustrated in FIG. 1. Thus, the depiction of cloud provider environment 106 in FIG. 1 should be taken as illustrative and not limiting to the present disclosure. For example, the elements of the cloud provider environment 106 or various constituents thereof could implement various Web services components and/or peer to peer network configurations to implement at least a portion of the processes described herein. The cloud provider environment 106 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In accordance with embodiments of the present disclosure, the virtualized networking service 109 can facilitate communication between serverless function executions, as executing on VM instances 153, or other serverless functionality, and compute resources 111, as existing within virtualized network environments and customer networking environments, via an SNI. Specifically, owners of a serverless function and/or of customer networks of compute resources 111 (which owners may be the same entity or different entities) may define SNIs that facilitate secure communication between executions of the function and the networks of compute resources 111. Such owners may illustratively interact with the virtualized networking service 109 (either directly or via other interfaces, such as those of the frontend 120) to define and configure an SNI, manage permissions of the SNI, and the like.

Illustratively, SNIs may be enabled at least partly by routing functionality provided by the virtualized networking service 109 and the cloud provider environment 106 generally. For example, network communications initiated within a given virtualized network of the cloud provider environment 106 may be encapsulated for transmission on the substrate network of the cloud provider environment 106. During encapsulation, various additional information regarding the communication may be included in header information of the post-encapsulation communication (e.g., within header values of an IP data packet). Such additional information can include "cloud metadata" that relates to operation of the cloud provider environment 106 or the substrate network, as opposed to operation of a virtualized network or resource. For example, such additional information can include a unique identifier of a virtualized network assigned by the virtualized networking service 109, a unique identifier of a compute resource 111 assigned by the cloud provider environment 106, a unique identifier of a serverless function on the serverless code execution system 110, or the like. The virtualized networking service 109 is illustratively configured to enable routing of network communications at least partly based on such cloud metadata. For example, data may be routed on the substrate network based at least partly on a virtualized network identifier, such that compute resources 111 of the virtualized network appear to communicate within a physical local area network (LAN). In accordance with embodiments of the present disclosure, the virtualized networking service 109 may further provide for routing between the function executions of virtualized networks via network interfaces defined by an SNI. Illustratively, an SNI may define a network interface routed between the function executions of a first virtualized network (associated with a first unique identifier) and a second virtualized network (associated with a second unique identifier) such that traffic of the first virtualized network received at the virtualized networking service 109 and addressed to the second virtualized isolated network is passed by the virtualized networking service 109 to the second virtualized isolated network.

Figure 2:
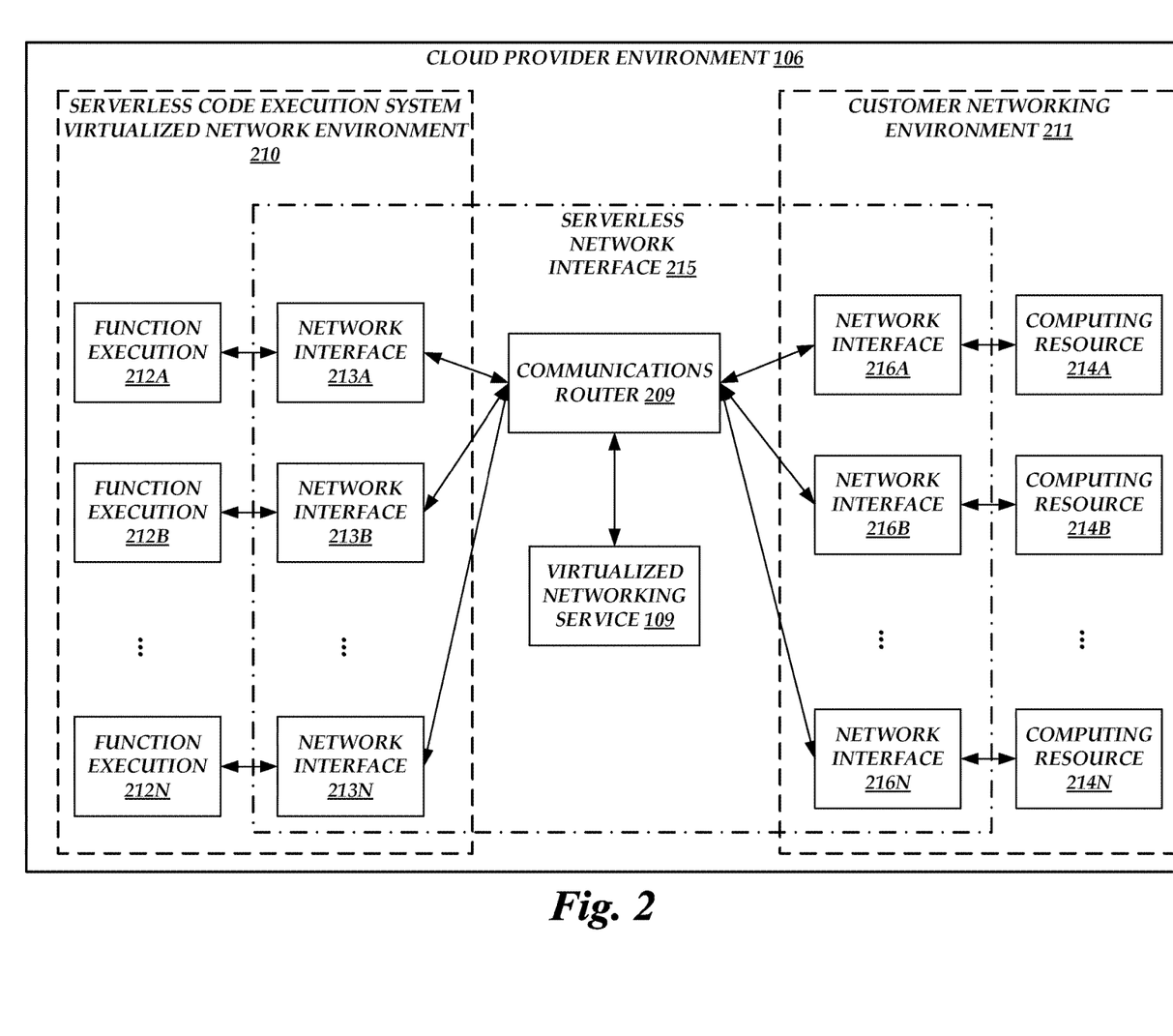
FIG. 2 depicts a logical view of how the virtualized networking service of the cloud provider environment of FIG. 1 that can enable network communication between a serverless function and customer networking environment utilizing an SNI.

FIG. 2 depicts a logical view of how a SNI 215 of the cloud provider environment 106 can facilitate network communication between two isolated virtualized network environments. Specifically, FIG. 2 depicts communication between a serverless code execution system virtualized network environment 210 and a customer networking environment 211.

Illustratively, each VM instance 153 of FIG. 1 may be connected (via the virtualized networking service 109 and a communications router 209) to the serverless code execution system virtualized network environment 210, which represents a virtual network, such as a subnet, on the cloud provider environment 106. Accordingly, function executions 212A-N (each of which illustratively represents a process executing on a VM instance 153) may communicate with each other within the environment 210. Furthermore, attached to the environment 210 may be an instance of a SNI 215, which may contain network interfaces 213A-N that communicate with the function executions 212A-N. Similarly, a cloud provider environment 106 may contain a customer networking environment 211 within the SNI 215, also containing network interfaces 216A-N that communicate with the computing resources 214A-N. The environment 210 may contain various additional network objects, not shown in FIG. 2, that provide additional network connectivities, controls or restrictions. For example, the environment 210 may include gateways that provide access to external networks (such as network 104), firewalls that restrict traffic on the environment 210, etc.

A user owning a given serverless instance on the serverless code execution system 110 may desire to propagate configurations of one serverless instance to their other serverless instances. By defining a SNI 215, the SNI 215 may attach to any number of virtualized network environments 210 and/or customer networking environments 211. Once attached, the SNI 215 utilizes network interfaces to facilitate communication between the environments via a communications router 209.

In one embodiment, the SNI 215 is a logical representation of network interfaces connected via a communications router 209 provided by the virtualized networking service 109. Illustratively, the SNI may correspond to a first logical network interface in the serverless code execution system virtualized network environment 210 and a second logical network interface in the customer networking environment 211, which interfaces are connected via routing provided by the virtualized networking service 109. For example, each interface may accept traffic from their respective environments 210 and 211, append cloud metadata to such traffic such as a source and destination environment, a source or destination element such as a function execution 212 or network interface 213, etc. (e.g., via encapsulation), and forward the traffic with appended metadata to the communications router 209 provided by the virtualized networking service 109 that routes the traffic to a corresponding interface within the destination environment. The corresponding interface may then receive the traffic, remove the cloud metadata (e.g., via decapsulation), and forward the traffic to the destination element. Permissions information may be applied at a source interface, a destination interface, or both. Additionally or alternatively, permissions information may be applied during routing of the traffic by the virtualized networking service 109.

In accordance with embodiments of the present disclosure, the SNI 215 may be user defined and managed. For example, an owner of a serverless function 212 may request creation of a SNI 215 and specify configurations for the function executions. The owner may further specify permissions for traffic flowing across the SNI 215. Illustratively, permissions may be in the form of firewall rules, specifying for example individual sources and destinations (e.g., as serverless functions and network interfaces 213) among other possible parameters. Unlike a traditional firewall, the individual sources and destinations may be specified by cloud metadata, thus enabling the SNI 215 to implement the rules even as network parameters (such as network addresses) of sources and destinations vary. As discussed above, by decoupling creation and management of SNIs 215 from creation and management of functions, issues related to transparent creation and management are resolved.

In some embodiments, the virtualized networking service 109 can further provide for discovery of devices or interfaces associated with the SNI. For example, the virtualized networking service 109 may enable a serverless instance associated with an SNI 215 to discover other members of the SNI 215 (e.g., instances associated with the SNI) by requesting membership information of the other members and returning membership contact information (e.g., network address information of the member instance) to the instance. In some instances, the virtualized networking service 109 may enable external devices (e.g., associated with other networks) to query for and obtain a listing of devices or interfaces associated with the SNI 215. For example, the virtualized network service 109 may be configured to obtain a query from a client device 105 to discover interfaces on the SNI 215, and return in response to the query a listing of the interfaces 213A-N and 216A-N. In one instance, discoverability parameters are set as configuration parameters of the SNI 215. For example, the SNI 215 parameters may specify permissions designating what entities may discover devices or interfaces of the SNI 215, and the virtualized networking service 109 may verify that a requesting entity is permitted to conduct discovery according to such permissions prior to providing a response.

While FIG. 2 depicts a single SNI 215 that spans the environments 210 and 211, other configurations are possible. For example, the SNI 215 may logically exist within the environment 210 or within the environment 211, as opposed to spanning the environments. As another example, multiple SNIs 215 may operate in conjunction with one another. For example, an owner of a function may specify a first SNI 215. The owner may further specify other SNIs 215 that are permitted to communicate with the first SNI 215. Similarly, an owner of the user virtualized network environment 210 may specify a second SNI 215 and permissions defining how network interfaces 213 can transmit and receive information at the second SNI 215. The owner may further specify other SNIs 215 (e.g., the first SNI) that are permitted to communicate with the second SNI 215. Accordingly, traffic may flow from a function execution 212 to a computing resource 214 via network interfaces 213 and network interfaces 216 or vice versa when permitted by the rules of the first and second SNIs 215, as defined by the respective owners of the serverless function and the network interfaces 213. Accordingly, depiction of a single SNI 215 in FIG. 2 is intended to be illustrative.

While FIG. 2. depicts multiple serverless function executions 212 within the environment 210, other configurations are possible. For example, within the environment 210, there may be other types of serverless instances. A serverless function only provides one example of a serverless instance. This may include other types of serverless computes, such as serverless machine learning models, serverless Audio/Video processing, serverless extract, transform, and load (ETL), etc. Other types of serverless services may also include types of serverless data storage, such as serverless databases, data lakes, data stream handling, data transformation, serverless search systems, etc. Therefore, for purposes of this disclosure, a reference to a serverless "function" in this disclosure may also apply to any of the above serverless instances.

Figure 3:
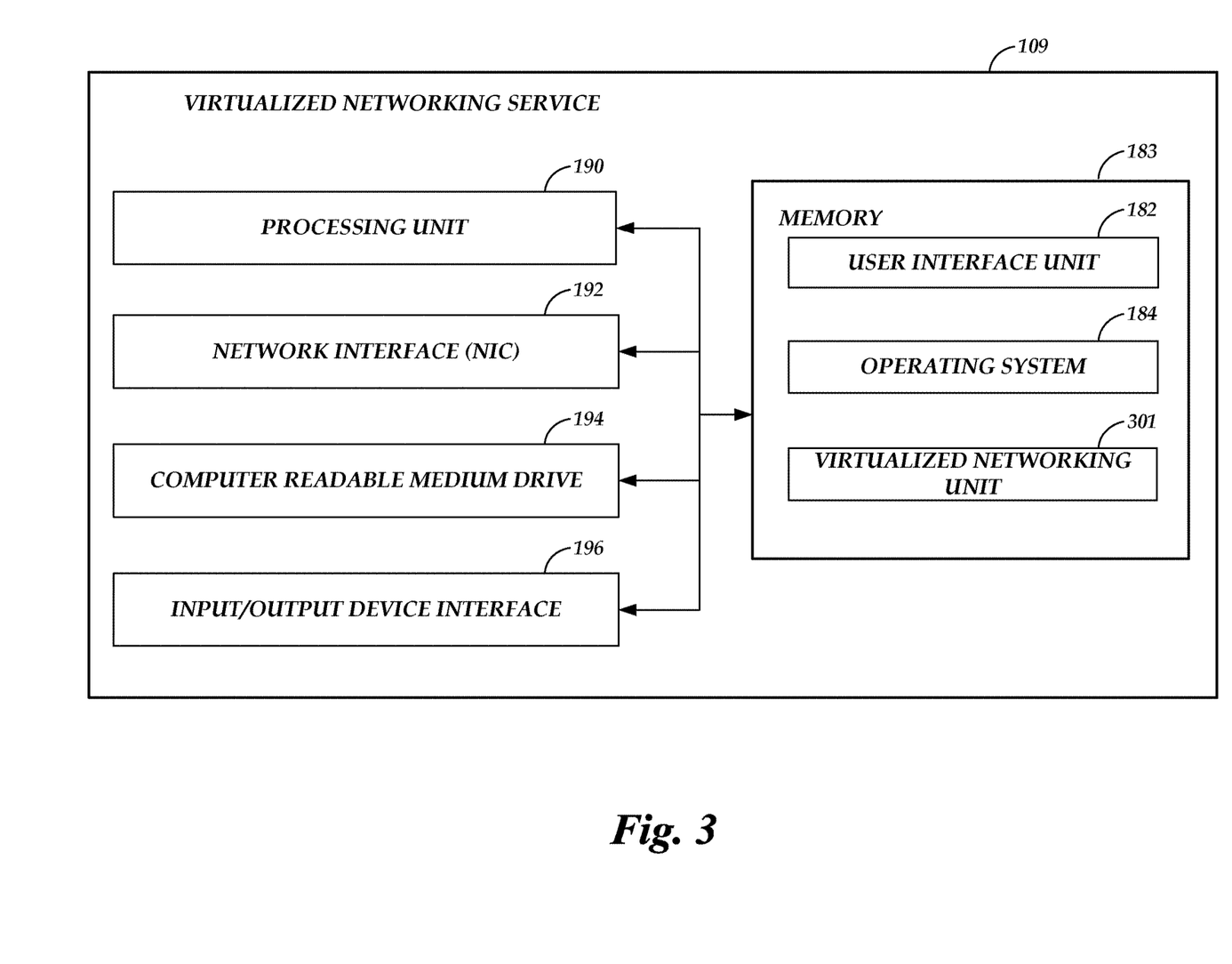
FIG. 3 depicts a general architecture of a computing device providing a virtual networking service of FIG. 1 that may enable communication among executions of serverless functions via an SNI.

FIG. 3 depicts a general architecture of a virtualized networking service 109 that may enable communication among serverless functions according to an SNI in accordance with embodiments of the present disclosure. The general architecture of the virtualized networking service 109 depicted in FIG. 3 includes an arrangement of computer hardware and software modules that may be used to implement aspects of the present disclosure. The hardware modules may be implemented with physical electronic devices, as discussed in greater detail below. The virtualized networking service 109 may include many more (or fewer) elements than those shown in FIG. 3. Additionally, the general architecture illustrated in FIG. 3 may be used to implement one or more of the other components illustrated in FIG. 1.

As illustrated, the virtualized networking service 109 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 183 and further provide output information for an optional display (not shown) via the input/output device interface 196. The input/output device interface 196 may also accept input from an optional input device (not shown).

The memory 183 may contain computer program instructions (grouped as modules in some embodiments) that the processing unit 190 executes in order to implement one or more aspects of the present disclosure. The memory 183 generally includes random access memory (RAM), read only memory (ROM) and/or other persistent, auxiliary, or non-transitory computer readable media. The memory 183 may store an operating system 184 that provides computer program instructions for use by the processing unit 190 in the general administration and operation of the virtualized networking service 109. The memory 183 may further include computer program instructions and other information for implementing aspects of the present disclosure. For example, in one embodiment, the memory 183 includes a user interface unit 182 that generates user interfaces (and/or instructions therefor) for display upon a computing device, e.g., via a navigation and/or browsing interface such as a browser or application installed on the computing device. In addition, the memory 183 may include and/or communicate with one or more data repositories (not shown), for example, to access user program codes and/or libraries.

In addition to and/or in combination with the user interface unit 182, the memory 183 may include a virtualized networking unit 301. The virtualized networking unit 301 operates to implement the functionality of the SNI by initiating the creation of the SNI and facilitating communication between the network interfaces associated with the SNI.

Figure 4:
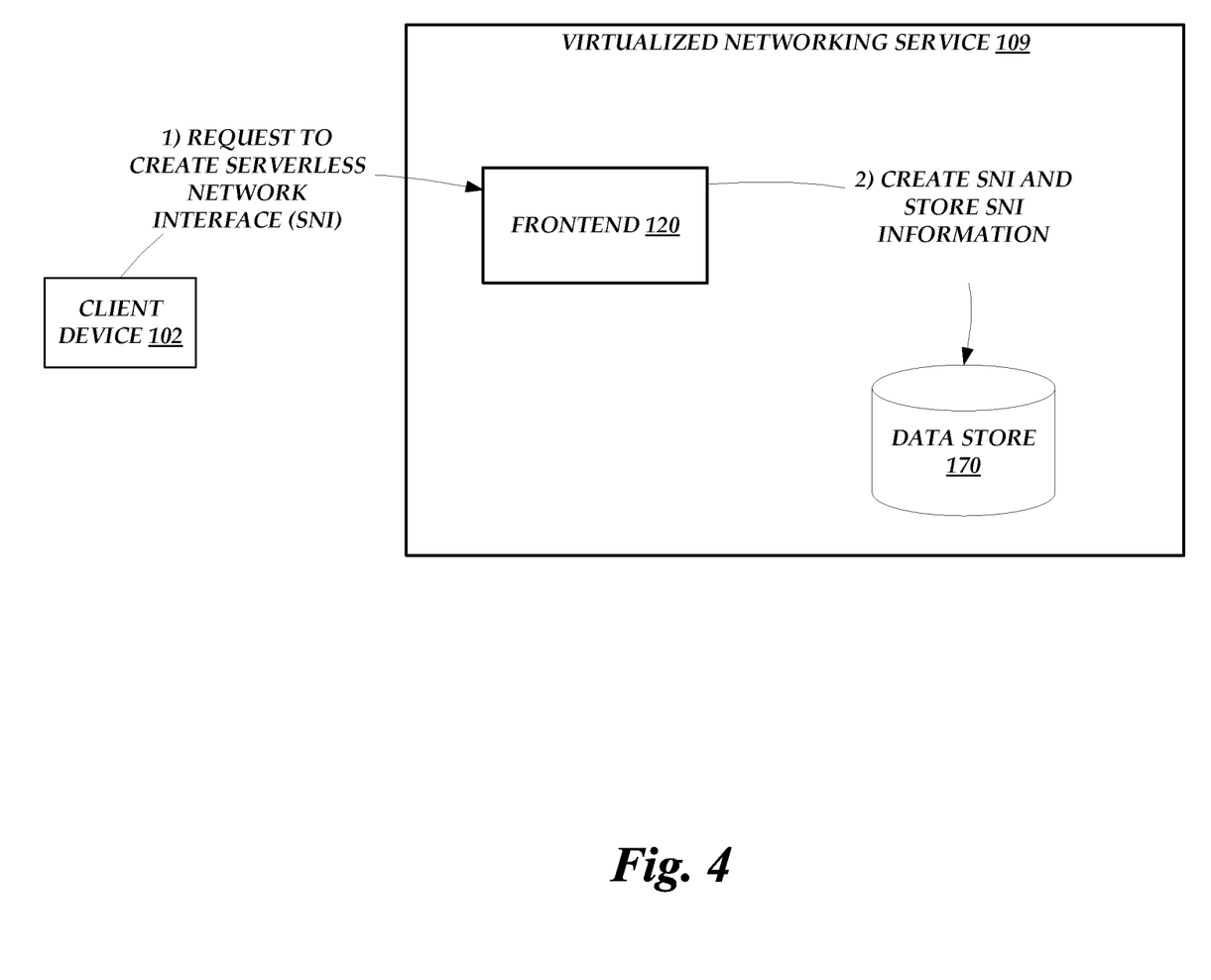
FIGS. 4 and 5 depict illustrative interactions for utilizing an SNI to facilitate communications between executions of serverless functions and virtualized network environments.
Figure 5:
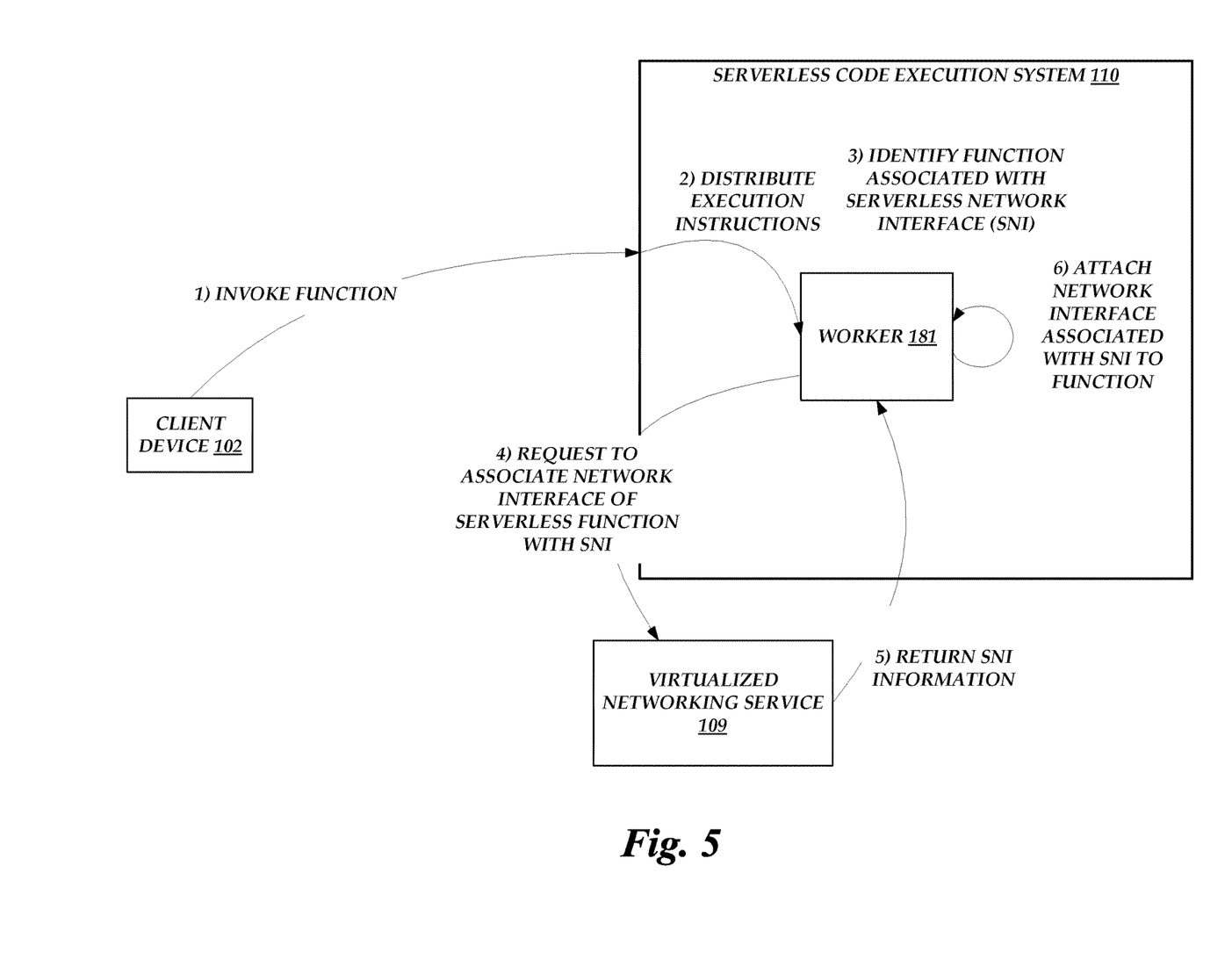

With reference to FIGS. 4 and 5, illustrative interactions will be described for utilizing SNIs to facilitate communications between executions of serverless functions and virtualized network environments. Specifically, FIG. 4 depicts illustrative interactions for creation of a SNI. FIG. 5 depicts illustrative interactions for dynamic instantiation of the SNI during execution of a serverless function, thus permitting communication of the function execution with a virtualized network environment of the SNI.

The interactions of FIG. 4 begin at (1), where a client device 102 transmits to the frontend 120 a request to create a SNI. The request can include a variety of parameters relating to the SNI. For example, the request may specify permissions for the SNI, such as a type, amount, or timing of traffic that is permitted to flow across the SNI. Illustratively, permissions may specify a volume of traffic permitted to flow across the SNI, a number of simultaneous connections supported by the SNI, or the like. Permissions may further specify one or more serverless functions (e.g., by unique identifier of the functions) whose executions are permitted to utilize the SNI. In some embodiments, permissions may specify serverless interfaces to which the SNI should link executions. The frontend 120 may store these permissions in the data store 170. The parameters can further include an intra-SNI communication type. For example, an intra-SNI communication type may be a mesh networking within the SNI where there is a mesh network between the instances associated with the SNI or no communication within the SNI. The parameters may also include rules for address allocation (e.g., how IP addresses are allocated to SNI-using-instances).

While FIG. 4 depicts SNI-centric permissions, in some embodiments permissions are additionally or alternatively specified with respect to logical entities that are permitted to utilize a SNI. For example, a frontend 120 may enable a client device 102 to create a SNI via interactions of FIG. 4 without specifying serverless functions or virtualized network environments to associate with the SNI. The frontend 120 may then return a unique identifier of the SNI to the client device 102. The client device 102 may in turn interact with the frontend 120 (or other interface, such as an interface of the virtualized networking service 109) to permit the SNI to be associated with executions of one or more serverless functions or with virtualized network environments. For example, a client device 102 may modify permissions of a serverless function to enable the function to access a SNI, by specifying the unique identifier of the SNI in the permissions of the function. Similarly, a client device 102 may modify permissions of a virtualized network environment to permit a SNI to send and receive communications in the environment.

In accordance with embodiments of the present disclosure, the virtualized networking service 109 may create the SNI as specified via the interactions of FIG. 4 at (2). As noted above, SNIs are illustratively associated with one or more logical network interfaces within respective environments, with each interface routing traffic between their respective environment and the virtualized networking service 109, which in turn may route the traffic to the other interfaces (while applying additional modifications, such as conducting NAT translation, applying firewall rules, etc.). Accordingly, creation of a SNI can include creating an appropriate interface in each environment, including an environment associated with the serverless code execution system 110 and a serverless interface associated with the SNI (e.g., as specified in permissions for the SNI). In some embodiments, creation of a SNI may further include modification of the virtualized networking service 109 to facilitate routing between the respective interfaces.

Additionally, in an alternative embodiment, the frontend 120 may store the information relating to the SNI without creating the SNI. For example, the frontend 120 may store the SNI permissions and other parameters in the data store 170.

Furthermore, while description is made herein with respect to a pair of interfaces, in some instances a SNI may correspond to multiple interfaces. For example, each interface may provide a given level of performance or a given set of resources (e.g., a given number of IP addresses, maximum connections, bandwidth, etc.).

Creation of a SNI as a logical object may be conceptually divided from lifecycle management of the SNI on the cloud provider environment 106, such as starting or stopping the SNI. For example, creation of a SNI may include specifying permissions of a SNI, while starting and stopping a SNI may include modifying a configuration of the cloud provider environment 106 to facilitate operation of the SNI, such as by creating network interfaces in respective virtualized environments that provide for traffic to flow between environments. Because such interfaces may consume resources in the respective environments (e.g., by requiring IP addresses to be allowed to the interfaces), conceptually dividing creation and lifecycle management can enable SNIs to be created while delaying consumption of resources until the SNI is started or initialized.

In one embodiment, users may directly manage lifecycle of a SNI. For example, a user via a client device 102 may interact with a frontend 120 or the virtualized networking service 109 to start or stop a SNI. In some instances, the frontend 120 can enable a user to stop a SNI immediately, thus enabling a user to implement a "kill switch" should they for example believe unauthorized traffic is traversing the SNI. In another embodiment, the serverless code execution system 110 manages lifecycle of a SNI, programmatically starting the SNI when a first execution of a serverless function associated with the SNI occurs and programmatically stopping the SNI when a last execution a serverless function associated with the SNI halts (or at a defined idle time thereafter). In this manner, resources associated with running the SNI (e.g., use of IP addresses within respective environments) can be limited to use while the SNI is needed.

While the interactions of FIG. 4 describe creation of a SNI with associated permissions, similar interactions may be used to alter or revoke permissions of a SNI. In some instances, revocation of permissions results in immediate modification of the SNI. For example, the frontend 120 may notify the virtualized networking service 109 when permission for a SNI are modified, such that the virtualized networking service 109 immediately alters its operation to reflect the modified permissions.

While the description herein of FIG. 4. refers to executions of serverless functions, other configurations are possible. A serverless function only provides one example of a serverless instance. There may be other types of serverless instances as described above, besides a serverless function, possible for the interactions of FIG. 4.

Illustrative interactions for initializing a SNI based on invocation of a serverless function with permissions to utilize the SNI are shown in FIG. 5. The interactions of FIG. 5 begin at (1), where a client device 102 transmits a call to the serverless code execution system 110 to invoke execution of a serverless function (e.g., a function previously created on the system 110). While FIG. 5 depicts invocation of a serverless function by a client device 102, other devices may additionally or alternatively invoke execution of a serverless function.

At (2), the serverless code execution system 110 distributes execution instructions for the serverless function to a worker 181. For example, the serverless code execution system 110 may apply load balancing techniques to select a worker 181 from a set of workers 181 previously associated with the serverless function, or may newly assign a worker 181 to handle executions of the serverless function.

In accordance with embodiments of the present disclosure, it may be beneficial for executions of serverless functions to interact with network resources within isolated, virtualized network environments. Accordingly, a worker 181 instructed to execute a serverless function associated with a SNI can detect such association and, if necessary, instantiate a SNI to facilitate sending and receiving data of the function execution through the SNI to a serverless interface (or other resources associated with the SNI, such as other instances of the function, instances of other serverless functions, etc.). As such, at (3), the worker 181 identifies an association between the invoked serverless function and a user-defined SNI (e.g., as created via the interactions of FIG. 4). For example, the worker 181 may retrieve the association data by accessing the virtualized networking service 109 and detect, within the data, an association a SNI.

Thereafter, at (4), the worker 181 transmits a request to the virtualized networking service 109 to associate a network interface of the serverless function with the SNI. For the purposes of illustration, it is assumed herein that a SNI has not yet been created when discussing FIG. 5. The request illustratively includes authentication information sufficient for the virtualized networking service 109 to validate the worker 181 as authorized to request association of the SNI. For example, the worker 181 may obtain, as part of execution instructions, authentication information that authenticates the worker 181 as part of the serverless code execution system 110, as authorized to execute the invoked function, etc. The virtualized network service 109 may inspect the authentication information to verify that the worker 181 is properly authenticated and authorized to request creation of the SNI.

At (5), the virtualized networking service 109 returns to the worker 181 SNI information enabling the worker 181 to associate an execution environment of the invoked serverless function with the SNI. For example, the information may include identifying information of an interface corresponding to the SNI that has been created, by the virtualized networking service 109, in a virtualized network environment of the serverless code execution system 110.

Alternatively, the virtualized network service 109 may first create the SNI before returning it to the worker 181, in the case that the SNI has not yet been created via the interactions of FIG. 4. As noted above, SNIs are illustratively associated with one or more logical network interfaces within respective environments, with each interface routing traffic between their respective environment and the virtualized networking service 109, which in turn may route the traffic to the other interfaces (while applying additional modifications, such as conducting NAT translation, applying firewall rules, etc.). Accordingly, creation of a SNI can include creating an appropriate interface in each environment, including an environment associated with the serverless code execution system 110 and a serverless interface associated with the SNI (e.g., as specified in permissions for the SNI). In some embodiments, creation of a SNI may further include modification of the virtualized networking service 109 to facilitate routing between the respective interfaces.

Accordingly, at (6), the worker 181, using the returned information, attaches the network interface associated with the SNI to an execution environment for the invoked function (e.g., a VM instance 153 supporting execution of the function). For example, the worker 181 may provision the environment with network access via an interface for the SNI, as identified in the return information, such that the environment can access the serverless interface. Illustratively, the interface may be attached as a default network interface of the environment (e.g., "eth0"). The worker 181 then executes the serverless function. Accordingly, during execution, the code of the function may access resources of a serverless interface associated with the SNI via the SNI, as discussed in more detail with respect to FIG. 2, above.

While FIG. 5 describes interactions to initialize a SNI, embodiments of the present disclosure may additionally or alternatively stop a SNI. For example, the serverless code execution system 110 or the virtualized networking service 109 may determine that no function execution is presently using a SNI, and stop the SNI by, for example, deleting the interfaces associated with the SNI. In another example, the SNI can be deprovisioned following long periods of idleness.

Additionally, while FIG. 5 describes interactions to attach a network interface associated with an SNI to a serverless function, embodiments of the present disclosure may additionally or alternatively attach a network interface associated with an SNI to other types of serverless instances as detailed above. A serverless function is one example of a serverless instance. Therefore, other types of serverless instances may be attached to a network interface associated with an SNI.

Figure 6:
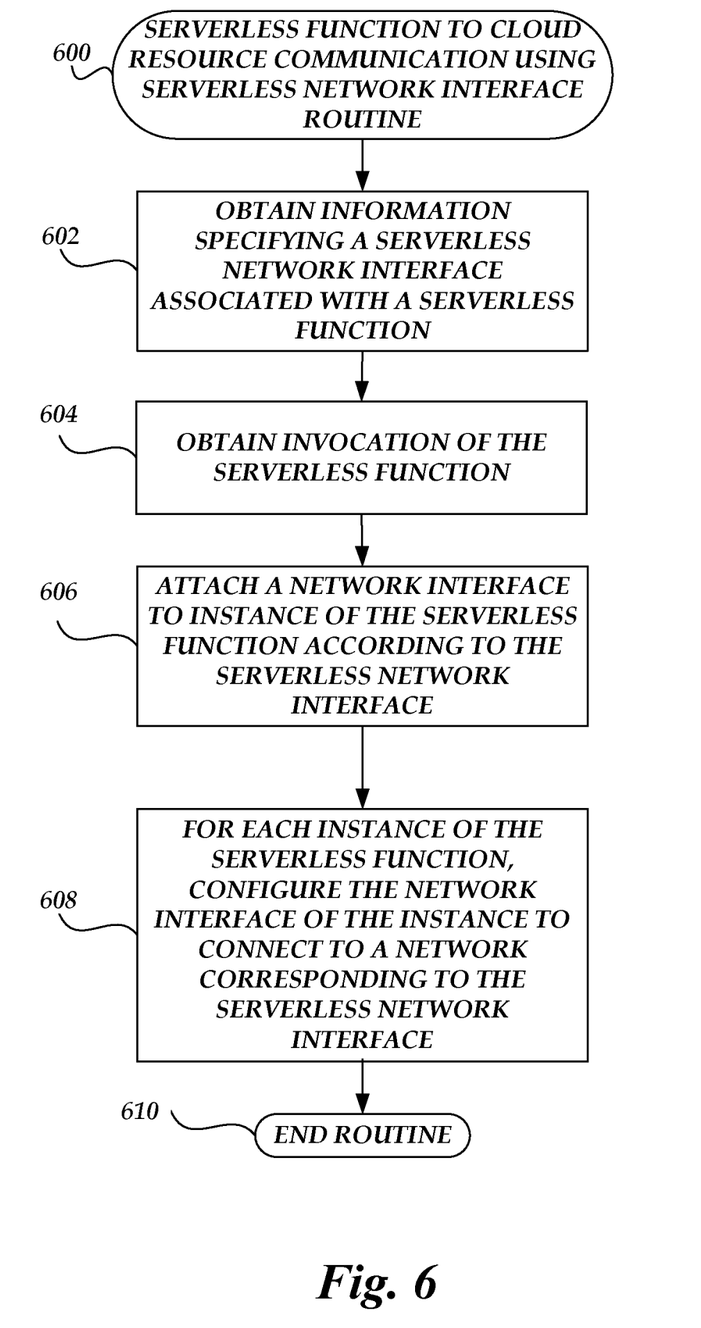
FIG. 6 is a flow chart depicting an illustrative routine for attaching and configuration a network interface associated with an SNI to provide communication between serverless functions and cloud resources in a virtualized network environment.

With reference to FIG. 6, an illustrative routine 600 will be described for using SNIs to provide communication between serverless functions and cloud resources in a virtualized network environment (e.g., a VPC or VNet). The routine 600 may be implemented, for example, by the serverless code execution system 110 (e.g., in connection with the virtualized networking service 109).

The routine 600 begins at block 602, where a serverless computing system obtains information specifying a SNI associated with a serverless function. The request can illustratively specify parameters of the SNI, including permissions of the SNI with respect to one or more serverless functions, permissions of the SNI with respect to one or more user virtualized network environments, network access parameters (e.g., internet access), filtering to conduct on the SNI (e.g., in the form of firewall rules), performance limits for the SNI (e.g., a maximum bandwidth, number of connections, etc.), traffic shaping to perform on the SNI, network connectivity, or the like. As discussed above, the request may be obtained from a client computing device 102 associated with an owner of the serverless function and the user virtualized network environment.

Based on the SNI associated with the serverless function, the serverless computing system may store an association between the SNI and the serverless function in a data store. The data store may store the definitions of the SNIs in the system.

At block 604, the serverless computing system obtains an invocation of a serverless function associated with (e.g., with permissions to access) a SNI. As noted above, the invocation may occur from a client computing device 102, from the serverless computing system, or from other network-connected devices.

For purposes of illustration, it will be assumed that the invocation is a first invocation of a function associated with the SNI, and thus that the SNI should be initialized to facilitate acceptance of communications from the function. Accordingly, at block 606, the serverless computing system initializes the SNI and attaches a network interface to the instance of the serverless function according to the SNI. For example, the serverless computing system may transmit a request to the virtualized networking service 109 to initialize the SNI, which may cause the service 109 to create an interface in a virtualized network environment of the serverless computing system that corresponds to the SNI. The service 109 illustratively further creates an interface within the user virtualized network environment associated with the SNI, and establishes routing rules such that traffic of the serverless-side interface is routed to the user virtualized network environment-side interface, and vice versa. The serverless computing system may then attach the interface to the execution environment, thus enabling the function, when executed in the environment, to communicate with the user virtualized network environment.

At block 608, for each instance of the serverless function, the serverless computing system configures the network interface of the instance to connect to a network corresponding to the SNI. By configuring the SNI, the serverless computing system can generate or configure a first network interface corresponding with a first function execution with a serverless code execution system virtualized network environment.

Additionally, the serverless computing system may initiate execution of user-defined code representing the serverless function in an execution environment with the serverless code execution system virtualized network. Then, the serverless code execution system 110 may obtain a network communication from the execution of the function. For example, the serverless code execution system 110 may obtain network traffic at the serverless-side interface. Thereafter, the serverless code execution system 110 can route the network communication to the user virtualized network environment based on the specifications of the SNI. For example, the serverless code execution system 110 may encapsulate the network communication with cloud metadata include, for example, an identifier of the source serverless function and an identifier of the destination virtualized network environment. The serverless code execution system 110 can then pass the encapsulated traffic to the virtualized networking service 109, which may route the communication according to the cloud metadata to the corresponding interface in the user virtualized network environment (e.g., while applying filtering, throttling, shaping, etc. as set by parameters of the SNI). Accordingly, the function, when executed, can communicate with network endpoints within the user virtualized network environment. Notably, such communication occurs on the basis of cloud metadata corresponding to permissions of the SNI (e.g., an identifier of the serverless function and the user virtualized network environment). As such, users need not for example define IP routing rules to route between the function and the environment. Accordingly, routing of communications is simplified relative to IP-based routing. Moreover, because the SNI is explicitly surfaced to the user (e.g., as opposed to transparently managed by the serverless code execution system 110), the user is enabled to control various aspects of communication, such as firewall rules to be applied, performance metrics for the SNI, permissions for accessing the SNI, etc. The routine 600 then ends at block 610.

While FIG. 6 describes interactions to attach a network interface associated with an SNI to an instance of a serverless function, embodiments of the present disclosure may additionally or alternatively attach a network interface associated with an SNI to other types of serverless instances as described above. A serverless function is one example of a serverless instance. Therefore, other types of serverless instances may be attached to a network interface associated with an SNI.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Similarly, a "set" includes one or more of the specified components.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing network interfaces for serverless applications, the system comprising:
   a first set of computing devices implementing a virtual network service configured to provide virtual networking functionality using a substrate physical network;
   a data store storing definitions of serverless network interfaces (SNI) comprising fields for a network connection type, firewall rules for ingress and egress traffic, and DNS configuration; and
   a second set of computing devices implementing a serverless computing service configured to:
      obtain information specifying one or more of the fields as configuration for a SNI for a serverless application;
      instantiate the SNI at least partly by configuring the virtual network service to route data according to the configuration of the SNI;
      store an association between the SNI and the serverless application in the data store;
      for each invocation of the serverless application:
         allocate computing resources of the serverless computing service to generate an instance of the serverless application;
         configure a network interface of the instance to attach to the SNI, thereby causing the network interface to route data to the virtual network service according to the configuration of the SNI; and
         initiate an execution of user-defined code representing the serverless application in an execution environment corresponding to the instance,
      wherein at least two instances providing the serverless application are concurrently attached to the SNI; and
      route network traffic for the serverless application via the attached SNI according to the configuration.

2. The system of claim 1, wherein the virtual network service enables discovery of serverless instances associated with the serverless network interface, wherein to enable discovery of serverless instances associated with the serverless network interface, the virtual network service is configured to:
   obtain a request from the serverless function for membership of a serverless network interface; and
   return network address information for serverless instances associated with the serverless network interface.

3. The system of claim 1, wherein the system is further configured to deallocate resources associated with the serverless network interface in response to determining that no serverless instances are associated with the serverless network interface.

4. The system of claim 1, wherein one or more configurations of a network connectivity interface of the serverless function are permissions to be applied to network communications traversing the serverless network interface.

5. A method comprising:
   obtaining information associating a serverless functionality with a serverless network interface;
   creating the serverless network interface based on the information, wherein creation of the serverless network interface includes configuring a virtual network service to route data according to the configuration of the serverless network interface;
   obtaining invocations of the serverless functionality; and
   in response to each invocation of the serverless functionality, attaching the serverless network interface to a serverless instance associated with the invocation and providing the serverless functionality at least partly by initializing a network interface, associated with the serverless instance associated with the invocation and providing the serverless functionality, to communicate with the virtual network service,
   wherein at least two serverless instances providing the serverless functionality are concurrently attached to the serverless network interface.

6. The method of claim 5, wherein a network corresponding to the serverless network interface is a mesh network between instances of the serverless functionality.

7. The method of claim 5, wherein configuring the virtual network service to implement routing associated with the serverless network interface includes configuring the virtual network service to route between the at least two serverless instances attached to the serverless network interface and an external network.

8. The method of claim 5, wherein configuring the virtual network service to implement routing associated with the serverless network interface includes configuring the virtual network service to route between the at least two serverless instances attached to the serverless network interface and a virtual private cloud.

9. The method of claim 5, wherein the virtual network service enables discovery of the at least two serverless instances associated with the serverless network interface, wherein to enable discovery of a second function, the virtual network service is configured to:
   obtain a request from the serverless functionality for membership of the serverless network interface; and
   return network address information for the at least two serverless instances associated with the serverless network interface.

10. The method of claim 5, wherein the serverless functionality is one of a serverless function, a serverless database, or a serverless search system.

11. The method of claim 5, further comprising deallocating resources associated with the serverless network interface in response to determining that no serverless instances are associated with the serverless network interface.

12. The method of claim 5, wherein the information specifies one or more configurations of a network connectivity interface of the serverless functionality comprising permissions to be applied to network communications traversing the serverless network interface.

13. One or more non-transitory computer-readable media comprising computer-executable instructions that, when executed, by a cloud provider system causes the cloud provider system to:
    obtain information associating a serverless functionality with a serverless network interface;
    create the serverless network interface based on the information, wherein creation of the serverless network interface includes configuring a virtual network service to route data according to the configuration of the serverless network interface;
    obtain invocations of the serverless functionality; and
    in response to each invocation of the serverless functionality, attach the serverless network interface to a serverless instance associated with the invocation and providing the serverless functionality at least partly by initializing a network interface, associated with the serverless instance associated with the invocation and providing the serverless functionality, to communicate with the virtual network service,
    wherein at least two serverless instances providing the serverless functionality are concurrently attached to the serverless network interface.

14. The one or more non-transitory computer-readable media of claim 13, wherein a network corresponding to the serverless network interface is a mesh network between instances of the serverless functionality.

15. The one or more non-transitory computer-readable media of claim 13, wherein configuring the virtual network service to implement routing associated with the serverless network interface includes configuring the virtual network service to route between the at least two serverless instances attached to the serverless network interface and an external network.

16. The one or more non-transitory computer-readable media of claim 13, wherein configuring the virtual network service to implement routing associated with the serverless network interface includes configuring the virtual network service to route between serverless instances attached to the serverless network interface and a virtual private cloud.

17. The one or more non-transitory computer-readable media of claim 13, wherein the virtual network service enables discovery of the at least two serverless instances associated with the serverless network interface, wherein to enable discovery of a second function, the virtual network service is configured to:
    obtain a request from the serverless functionality for membership of the serverless network interface; and
    return network address information for the at least two serverless instances associated with the serverless network interface.

18. The one or more non-transitory computer-readable media of claim 13, wherein the serverless functionality is one of a serverless function, a serverless database, or a serverless search system.

19. The one or more non-transitory computer-readable media of claim 13, wherein the computer-executable instructions, when executed by the cloud provider system, further cause the cloud provider system to deallocate resources associated with the serverless network interface in response to determining that no serverless instances are associated with the serverless network interface.

20. The one or more non-transitory computer-readable media of claim 13, wherein the information specifies one or more configurations of a network connectivity interface the serverless functionality comprising permissions to be applied to network communications traversing the serverless network interface.

* * * * *